United States Patent Office 2,789,040
Patented Apr. 16, 1957

2,789,040

PROCESS FOR PREPARING STABLE GELLED HYDROCARBONS

William H. Goff and Willis L. Banks, Port Arthur, Tex., assignors to The Texas Company, New York, N. Y., a corporation of Delaware No Drawing. Application June 20, 1952,
Serial No. 294,733

5 Claims. (Cl. 44—7)

The present invention relates to a gelling agent and a novel gelled hydrocarbon composition which is prepared therewith. The invention also includes a novel procedure for preparing the gelled hydrocarbon compositions. The invention is particularly concerned with the preparation of gelled gasoline which is useful in incendiary munitions, bombs and flame throwers.

The gelling agents presently employed for the manufacture of gelled gasoline used in incendiary bombs and in flame throwers are generically termed Napalm and are compounded from two distinctive components. One component is aluminum laurate, a saturated fatty acid containing at least 40 to 50 percent aluminum laurate or an aluminum salt of a functionally related acid. The second component is an aluminum soap or soaps of cycloparaffinic or unsaturated acids, for example, aluminum naphthenate, aluminum oleate and an aluminum oleate-linoleate mixture. The preparation of Napalm gelling agent requires special techniques such as coprecipitation and careful drying in order to yield a product which combines with gasoline to yield a stable gel. In the present invention, stable hydrocarbon gels are rapidly produced employing a gelling agent whose manufacture does not require the use of coprecipitation and drying operations requiring close control. Moreover, the novel gelling agent is produced from readily available materials, thereby relieving the shortage of lauric acid and naphthenic acids which are in critical supply.

The novel gelling agent of this invention is a saponification product of a basic alkali metal compound and a straight chain paraffin wax oxidate characterized by a Neut. No. between 150 and 275 and a Neut. No. to Sap. No. ratio higher than 0.6. The novel gelling agents of this invention are not usually isolated per se because stable hydrocarbon gels are produced in situ by the addition of a basic alkali metal compound such as sodium hydroxide to a hydrocarbon solution containing a wax oxidate of prescribed composition. Since this is a novel procedure for producing stable gels, this invention includes within its scope a novel process for preparing gelled hydrocarbons, novel gelling agents and novel gelled hydrocarbon fractions.

The novel gelled hydrocarbons of this invention are usually prepared by dissolving 5 to 20 percent and preferably 8 to 15 percent of a wax oxidate of prescribed type in a hydrocarbon solvent such as gasoline, naphtha, kerosene, etc. and adding as rapidly as possible with suitable stirring a concentrated solution of alkali metal hydroxide in an amount slightly in excess of that required for saponification on the basis of the Sap. No. of the prescribed paraffin wax oxidate. In less than one minute there is formed a heavy stable gel which is characterized by the fluidity and stickiness required for gelled hydrocarbons for use in flame throwers, incendiary munitions and fire bombs. The above mixing may be carried out at room temperature, for example, between 60 and 100° F.

The optimum concentration of gelling agents in the hydrocarbon fraction depends upon the consistency desired in the final gel. Light fractions such as gasoline or naphtha as well as the higher molecular weight fractions such as kerosene, gas oil or even light pale oils will dissolve sufficient gelling agent to produce a heavy gel. In general, the gelled hydrocarbons comprise 77 to 93 percent hydrocarbon and 7 to 23 percent gelling agent consisting of alkali metal salts of the wax oxidate of prescribed composition. The large range of hydrocarbons which may be used will give a wide selection of ignition characteristics in the final gel.

The advantages of the novel gelling agent and gelled hydrocarbons of this invention over the use of conventional Napalm gelling agents in gelled hydrocarbon fuels are substantial and important. The use of sodium soaps rather than aluminum soaps is a distinct economic advantage, but of more importance is the fact that the gelling agent of this invention is derived from readily available wax oxidates rather than critically short naphthenic acids and lauric acid-containing fats. In addition, the procedure of this invention whereby a heavy stable gel is simply prepared by the addition of concentrated aqueous caustic to a hydrocarbon solution containing at least 5 percent of the specified wax oxidate fraction is a distinct advance over the conditions required for preparation of Napalm type gelled gasoline fuels involving preliminary preparation of dry aluminum soaps by a coprecipitation procedure and subsequent addition of the dry aluminum soap to the hydrocarbon fuel with adequate mixing. The advantages residing in the in situ mode of preparation of this invention are apparent.

The novel gelling agent of the invention is prepared by saponification of a wax oxidate of prescribed composition with a basic alkali metal compound. Normally, alkali metal hydroxides or alkali metal carbonates are used to form the saponification product. Although sodium hydroxide or carbonate is usually employed to prepare the gelled hydrocarbon fractions, the basic compounds of other alkali metals such as potassium and lithium may also be used to prepare gelling agents which give stable hydrocarbon gels.

In the in situ preparation of gelled hydrocarbon fractions, a concentrated aqueous solution of basic alkali metal compounds which is in excess of the amount required for saponification of the dissolved wax oxidate is generally employed. An excess can be employed without adversely affecting the stability of the formed hydrocarbon gel. The aqueous solution of basic alkali metal compound employed for the in situ preparation of gelled hydrocarbons should contain a minimum concentration of at least 35 weight percent in order to prevent the incorporation of excess amounts of water in the gelled hydrocarbon. It is advisable, however, to employ more concentrated solutions than the 35 percent minimum, and solutions containing higher than 45 weight percent basic alkali metal compounds are recommended. For example, excellent results are obtained with a 49 percent solution of sodium hydroxide.

The formation of stable hydrocarbon gels is very critical with respect to the wax oxidate component of the gelling agent. It is necessary that the oxidate be derived from a straight chain paraffin wax and possess a Neut. No. between 150 and 275 and a Neut. No. to Sap. No. ratio higher than 0.6. Oxidates derived from petrolatums and microcrystalline waxes cannot be used in the formation of the novel gelling agent of this invention. Moreover, if the Neut. No. is not within the specified range, hydrocarbon gels formed therewith are unstable. If the Neut. Nos. of the paraffin wax oxidate are below 150, unstable gels result, and if the Neut. Nos. are higher than 275, the oxidate tends to have large naphtha-insoluble fractions and is undesirable for the formation of stable hydrocarbon gels. A final requirement of the wax oxidate is that it be an acid type oxidate in which the Neut. No. to Sap. No. ratio is higher than 0.6. Preferred straight chain paraffin wax oxidates for use in this invention have a Neut. No. between 200 and 250 and a Neut. No. to Sap. No. ratio between 0.60 and 0.75.

Straight chain paraffin wax oxidates having the properties required for use in the production of the novel gelling agents of this invention can be produced in accordance with the procedure disclosed in a copending application, Serial No. 192,381, filed October 26, 1950, and now abandoned, in the name of John K. McKinley, for producing acid-type wax oxidates. The oxidation of a straight chain paraffin wax containing less than 5 percent oil with air at the conditions prescribed in this copending application, namely, a temperature between 230 and 290° F., a pressure between 30 and 300 p. s. i. g. and an air feed rate of 10 to 50 cubic feet per pound of wax per hour, yields in a period of about 6 to 8 hours a wax oxidate having the required Neut. No. to Sap. No. ratio above 0.6 and a Neut. No. falling within the 200 to 250 preferred range.

Since one of the major features of this invention is that stable hydrocarbon gels are formed when the gelling agent is formed in situ in the hydrocarbon solution, it is not customary to isolate the gelling agent. Isolation of the gelling agent is effected by addition of a solution of alkali metal hydroxide or alkali metal carbonate to the paraffin wax oxidate in an amount which is usually in excess of that required for saponification based on the Sap. No. of the wax oxidate. After saponification, the gelling agent is isolated by dehydration of the mixture. The gelling agent can be incorporated in the hydrocarbon solutions in the specified concentrations to yield stable hydrocarbon gels. The amount of the isolated gelling agent used for preparation of the stable hydrocarbon gels is equivalent to the quantity of gelling agent specified for in situ formation of gelled hydrocarbons, namely, 7 to 23 weight percent of the total gelled hydrocarbon mixture.

Although it is possible to use the total wax oxidate of prescribed composition in the preparation of the gelling agent and gelled hydrocarbons of this invention, it has been found that superior results are obtained by rejecting the hydrocarbon-insoluble fraction, if any, prior to addition of caustic solution. Any hydrocarbon-insoluble fraction formed on making the hydrocarbon solution of wax oxidate can be incorporated in the gel, but normally this fraction is discarded prior to addition of caustic solution because of the superior gels thereby produced.

In the "in situ" formation of gelled hydrocarbons, the wax oxidate is melted at about 130° F. and dissolved in the hydrocarbon solution. The addition of the necessary amount of concentrated solution of alkali metal hydroxide is then added to the hydrocarbon solution to form the stable hydrocarbon gel. If the gelling agent is to be isolated, the hydrocarbon solvent is stripped from the wax oxidate and then the specified amount of concentrated solution of alkali metal hydroxide is added to the wax oxidate.

It has also been found that it is desirable to water wash the wax oxidate of prescribed composition prior to its solution in the hydrocarbon solvent. The water washing, which removes low molecular weight acidic bodies and catalysts from the wax oxidate, is usually effected at a temperature of 125 to 200° F. with a volume of water which is approximately equal in weight to the weight of the wax oxidate. More than one washing may be performed.

The preparation of stable hydrocarbon gels by the process of this invention is illustrated in the following examples, Example I illustrates the properties of a wax oxidate fraction isolated by water washing and naphtha extraction from a paraffin wax oxidate having the prescribed requirements of Neut. No. and Neut No. to Sap. No. ratio; Examples II, III and IV illustrate the preparation of gelled gasoline, gelled kerosene and gelled diesel oil, respectively, with the naphtha-soluble wax oxidate fraction prepared in Example I; Example V illustrates the preparation of gelled gasoline directly from a crude oxidate.

EXAMPLE I

A 125 to 127° F. M. P. semi-refined wax, which was obtained by sweating and pressing an unpressed paraffin distillate with subsequent acid treatment, neutralization, steaming, brightening and filtration through Porocel, was oxidized in an aluminum reactor with air in the presence of 0.4 percent potassium permanganate which is added to the reaction mixture in the form of a 6 percent aqueous solution. The air oxidation was effected at a temperature of about 270° F., a pressure of 65 p. s. i. g. and an air rate of 20 standard cubic feet per pound of wax per hour. As a result of this oxidation, there was obtained in a period of about 7 hours an 89 percent yield (basis of wax charge) of oxidate which was characterized by a Neut. No. of 207 and a Neut No. to Sap. No. ratio of 0.61 and possessed a 15 percent unsaponifiable content. The above outlined procedure for wax oxidation is disclosed in the previously identified copending application of John K. McKinley.

Water washing of 60.9 pounds of this crude oxidate twice with an equal weight of water each time at approximately 150° F. yielded 59.2 pounds of a water-washed product having a Neut. No. of 177 and a Sap. No. of 277, an unsaponifiable content of 17.9 percent and a water content of 8.8 percent.

To illustrate the nature of the wax oxidate fraction, 34.2 pounds of water-washed oxidate in molten state was then extracted with stirring with twice its weight of 200 E. P. naphtha, the insoluble portion allowed to settle and the naphtha extract phase separated. After naphtha stripping, there was recovered 22 pounds of an oxidate fraction characterized by a Neut. No. of 157, a Sap. No. of 242, an unsaponifiable content of 20.3 and a water content of 0.1 percent. On the basis of the original paraffin wax charged to the oxidation reaction, the production of the desired wax oxidate fraction amounted to 55 percent.

EXAMPLE II

The production of gelled gasoline 20 grams of naphtha-soluble wax oxidate prepared as outlined in Example I was melted at a temperature of approximately 130° F., and was poured into 180 grams of gasoline at room temperature to form a 10 percent solution. 8 to 10 grams of 49 percent sodium hydroxide solution was poured into the gasoline solution with stirring. The sodium hydroxide solution should be added as quickly as possible in order to prevent premature gelling. After the addition was completed, stirring was continued until a clear, almost transparent stable gel was formed in less than one minute. The gelled gasoline was characterized by the following properties:

Penetrations, ASTM at 77° F.:
  Unworked _____ 209
  Worked 60 strokes_____ 300

EXAMPLE III

Preparation of gelled kerosene 20 grams of naphtha-soluble wax oxidate prepared as outlined in Example I was melted at a temperature of approximately 120° F. and was poured into 180 grams of kerosene at room temperature to form a 10 percent solution. 8 to 10 grams of 49 percent sodium hydroxide solution was poured as quickly as possible with stirring into the kerosene solution. After the addition was completed, stirring was continued until a clear, almost transparent stable gel was formed in less than one minute. The gelled kerosene was characterized by the following properties:

Penetrations, ASTM at 77° F.:
  Unworked _____ 186
  Worked 60 strokes_____ 350

EXAMPLE IV

*Preparation of gelled diesel oil*

20 grams of naphtha-soluble wax oxidate prepared as outlined in Example I was melted at a temperature of approximately 130° F. and was poured into 180 grams of diesel oil at room temperature to form a 10 percent solution. 8 to 10 grams of 49 percent sodium hydroxide solution was poured as quickly as possible with stirring into the diesel oil solution. After the addition was completed, stirring was continued until a clear, almost transparent stable gel was formed in less than one minute. The gelled diesel oil was characterized by the following properties:

Penetrations, ASTM at 77° F.:
  Unworked _____ 209
  Worked 60 strokes_____ 380

EXAMPLE V

*Preparation of gelled gasoline*

A 125 to 127° F. M. P. semi-refined wax, which was obtained by sweating and pressing an unpressed paraffin distillate with subsequent acid treatment, neutralization, steaming, brightening and filtration through Porocel, was oxidized in an aluminum reactor with air in the presence of 0.4 percent potassium permanganate which is added to the reaction mixture in the form of a 6 percent aqueous solution. The air oxidation was effected at a temperature of about 270° F., a pressure of 65 p. s. i. g. and an air rate of 20 standard cubic feet per pound of wax per hour. As a result of this oxidation, there was obtained in a period of about 7 hours an 89 percent yield (basic of wax charge) of oxidate which was characterized by a Neut. No. of 230 and a Neut. No. to Sap. No. ratio of 0.6 and possessed of 13 percent unsaponifiable content. 20 g. of this crude oxidate was melted at a temperature of approximately 130° F. and was poured into 180 g. of gasoline at room temperature to yield a 10 percent solution. 8 to 10 g. of 49 percent sodium hydroxide solution was poured as quickly as possible with stirring into the gasoline solution. After the addition of sodium hydroxide solution was completed, stirring was continued until a clear, almost transparent stable gel was formed in less than one minute. The gelled gasoline was characterized by the following properties:

Penetrations, ASTM at 77° F.:
  Unworked _____ 240
  Worked 60 strokes_____ 361

The foregoing examples illustrate the in situ preparation of the novel gelled hydrocarbon fractions of this invention. It will be apparent that it is possible to prepare the gelled hydrocarbons by merely dissolving the crude oxidate of prescribed composition in a hydrocarbon solvent, rejecting the insoluble fraction and then adding a concentrated solution of basic alkali metal compound in an amount slightly in excess of the theoretical amount required for saponification.

The superior stability of the gels prepared from the novel gelling agent of this invention and the simplicity with which they are prepared by direct addition of concentrated caustic to hydrocarbon solution of the gelling agent make this invention a substantial contribution to the military program.

Obviously many modifications and variations of the invention, as hereinbefore set forth, may be made without departing from the spirit and scope thereof, and therefore only such limitations should be imposed as are indicated in the appended claims.

We claim:

1. A process for preparing stable gelled hydrocarbons characterized by fluidity and stickiness useful for incendiary munitions which comprises adding a straight chain paraffin wax oxidate characterized by a Neut. No. between 150 and 275 and by a Neut. No. to Sap. No. ratio higher than 0.6 to a hydrocarbon fraction in the gasoline to light gas oil range so that a hydrocarbon solution is formed containing 5 to 20 percent of the oxidation product, and rapidly adding to said hydrocarbon solution an aqueous solution of an alkali metal hydroxide having a minimum concentration of 35 weight percent, in an amount sufficient for the saponification of the oxidation product.

2. A process according to claim 1 where the hydrocarbon fraction is gasoline.

3. A process according to claim 1 where the hydrocarbon fraction is kerosine.

4. A process according to claim 1 where the hydrocarbon fraction is in the diesel oil range.

5. A process according to claim 1 in which said wax oxidate is washed with an equal weight of water at a temperature of 125 to 200° F. and a hydrocarbon soluble fraction of said water-washed oxidate is then added to said hydrocarbon fraction.

References Cited in the file of this patent

UNITED STATES PATENTS

| | | |
|---|---|---|
| 2,356,340 | Murphree _____ | Aug. 22, 1944 |
| 2,383,906 | Zimmer et al. _____ | Aug. 28, 1945 |
| 2,443,378 | Dittmar _____ | June 15, 1948 |
| 2,486,455 | Zellner _____ | Nov. 1, 1949 |
| 2,606,890 | Polly et al. _____ | Aug. 12, 1952 |
| 2,637,695 | McKinley et al. _____ | May 5, 1953 |

FOREIGN PATENTS

| | | |
|---|---|---|
| 333,904 | Great Britain _____ | Aug. 14, 1930 |
| 433,780 | Great Britain _____ | Aug. 14, 1935 |
| 586,130 | Great Britain _____ | Mar. 7, 1947 |